(12) United States Patent
Da Cruz Pinto et al.

(10) Patent No.: US 8,990,914 B2
(45) Date of Patent: Mar. 24, 2015

(54) DEVICE, METHOD, AND SYSTEM FOR AUGMENTED REALITY SECURITY

(71) Applicant: Intel Corporation, Santa Clara, CA (US)

(72) Inventors: Juan Marcelo Da Cruz Pinto, Cordoba (AR); Francisco Cuenca-Acuna, Corodoba (AR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/630,655

(22) Filed: Sep. 28, 2012

(65) Prior Publication Data

US 2014/0096220 A1 Apr. 3, 2014

(51) Int. Cl.
*G06F 7/04* (2006.01)
*G06F 15/16* (2006.01)
*G06F 17/30* (2006.01)
*H04L 29/06* (2006.01)
*G06F 21/00* (2013.01)

(52) U.S. Cl.
CPC ..................................... *G06F 21/00* (2013.01)
USPC ................................................ 726/9; 726/28

(58) Field of Classification Search
USPC ......................................................... 726/9, 28
See application file for complete search history.

(56) References Cited

U.S. PATENT DOCUMENTS

| | | | | |
|---|---|---|---|---|
| 7,769,845 | B2 * | 8/2010 | Baron | 709/224 |
| 8,510,820 | B2 * | 8/2013 | Oberheide et al. | 726/9 |
| 8,607,306 | B1 * | 12/2013 | Bridge et al. | 726/1 |
| 2010/0161416 | A1 * | 6/2010 | Chung et al. | 705/14.53 |
| 2011/0179182 | A1 * | 7/2011 | Vadla Ravnas | 709/227 |
| 2011/0320741 | A1 * | 12/2011 | Tian et al. | 711/147 |
| 2014/0007205 | A1 * | 1/2014 | Oikonomou | 726/6 |

OTHER PUBLICATIONS

"Google Authenticator," Wikipedia, The Free Encyclopedia, retrieved from: <http://en.wikipedia.org/w/index.php?title=Google_Authenticator&oldid=473328844>, edited Jan. 26, 2012, 2 pages.

(Continued)

*Primary Examiner* — Dant Shaifer Harriman
(74) *Attorney, Agent, or Firm* — Barnes & Thornburg LLP

(57) ABSTRACT

Devices and methods for authenticating a user of a mobile computing device to a content server include establishing a communication session between a target computing device and the content server that is identified by a session ID. The target computing device generates a pairing token using the session ID, which pairing token may be a two-dimensional bar code such as a quick response ("QR") code, and presents the pairing token to the mobile computing device. The mobile computing device captures the pairing token and authenticates the user of the mobile computing device to an authentication server. The target computing device receives an authentication token from the authentication server in response to the mobile computing device successfully authenticating the user to the authentication server. The target computing device accesses content on the content server using the authentication token. Other embodiments are described and claimed.

16 Claims, 7 Drawing Sheets

(56) References Cited

OTHER PUBLICATIONS

"QR code," Wikipedia, The Free Encyclopedia, retrieved from: <http://en.wikipedia.org/w/index.php?title=QR_code&oldid=475792398>, edited Feb. 8, 2012, 11 pages.

"Near field communication," Wikipedia, The Free Encyclopedia, retrieved from: <http://en.wikipedia.org/w/index.php?title=Near_field_communication&oldid=475992897>, edited Feb. 9, 2012, 17 pages.

* cited by examiner

DEVICE, METHOD, AND SYSTEM FOR AUGMENTED REALITY SECURITY

BACKGROUND

As computing becomes more social and spans across devices, users need to authenticate themselves while using an increasing number of foreign devices. Often, those foreign devices are public, untrusted devices or are less-capable, special-purpose devices. Authenticating on such foreign devices allows the user to receive personalized services or to perform tasks using personal data. For example, a user may wish to authenticate to a friend's networked television set in order to share personal pictures or a movie; a user may wish to complete a purchase transaction using an online e-commerce identity; a user may provide personal information to a digital sign or kiosk in a retail store, in order to perform a personalized search for goods; and/or a user may log in to a website on a public computer, such as in an internet café. Of course, authenticating oneself directly on the public, untrusted device may expose the user's password, identification, and/or other personal information. For example, the public, untrusted device may have a virus or malware configured to capture and store such personal data.

BRIEF DESCRIPTION OF THE DRAWINGS

The concepts described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
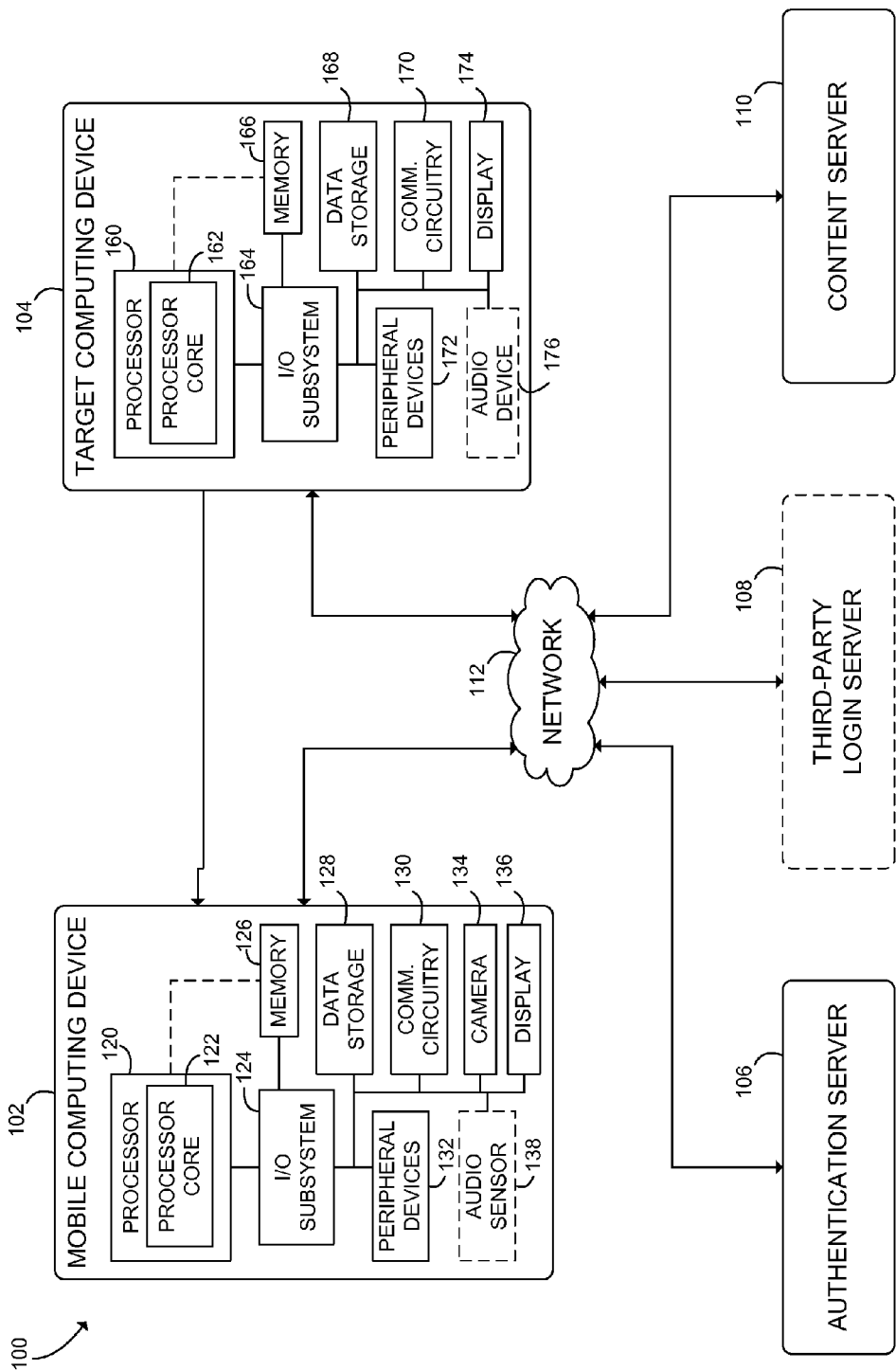
FIG. 1 is a simplified block diagram of at least one embodiment of a system for authenticating a user of a mobile computing device to a content server.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, in one embodiment, a system 100 for authenticating a user comprises a mobile computing device 102 controlled by the user, a target computing device 104 to access content on the content server 110, an authentication server 106 to authenticate the user, and, optionally, a third-party login server 108 to authenticate the user, all communicating over a network 112. To do so, as discussed in more detail below, the target computing device 104 is configured to establish a communication session with the content server 110 to generate a pairing token (not shown) using a session ID identifying the communication session. The target computing device 104 presents the pairing token to the mobile computing device 102, which captures the pairing token. Given the pairing token, the mobile computing device 102 contacts the authentication server 106 and optionally the third-party login server 108 over the network 112 and authenticates the user. Upon successful authentication of the user, the target computing device 104 receives an authentication token from the authentication server 106 over the network 112. The target computing device 104 uses the authentication token to access content on the content server 110, over the network 112.

The pairing token may be embodied as a visual or audio cue, and as such may be presented and captured using standard components of the target computing device 104 and mobile computing device 102, such as digital displays and digital cameras. Therefore, visual or audio pairing tokens may be implemented using standard, existing computing devices without requiring additional hardware components, in contrast to pairing methods using non-standard hardware, such as near-field communication (NFC) radio technology.

The system 100 allows the user to access content without entering sensitive information such as the user's credentials directly into the target computing device 104, which may be untrusted and potentially compromised. Instead, the user enters all sensitive information into the mobile computing device 102, which is controlled by the user and therefore usually trusted by the user. In this fashion, information security may be increased by associating physical security of the mobile computing device 102 with information security and thereby exploiting humans' intuitive sense of physical security.

Additionally, the system 100 allows the use of a target computing device 104 that may not include a full user interface or may not include a web browser, because the user credentials are entered on the user's mobile computing device 102. For example, the target computing device 104 may be a digital sign or kiosk device that lacks a keyboard, or a networked television set where password entry by remote control is cumbersome. Using the mobile computing device 102 to receive the user credentials makes the system 100 easy to use and encourages the use of longer, stronger passwords.

Referring back to FIG. 1, the mobile computing device 102 of the system 100 may be embodied as any type of computing device capable of performing the functions described herein. For example, the mobile computing device 102 may be embodied as, without limitation, a smart phone, a cellular telephone, a handset, a messaging device, a tablet computer, a laptop computer, a notebook computer, a mobile computing device, a multiprocessor system, a processor-based system, a consumer electronic device, and/or any other mobile computing device configured to capture the pairing token from the target computing device 104 and authenticate the user to the authentication server 106.

In the illustrative embodiment of FIG. 1, the mobile computing device 102 includes a processor 120, an I/O subsystem 124, a memory 126, a data storage 128, a communication circuitry 130, and one or more peripheral devices 132. In some embodiments, several of the foregoing components may be incorporated on a motherboard or main board of the mobile computing device 102, while other components may be communicatively coupled to the motherboard via, for example, a peripheral port. Furthermore, it should be appreciated that the mobile computing device 102 may include other components, sub-components, and devices commonly found in a computer and/or computing device, which are not illustrated in FIG. 1 for clarity of the description.

The processor 120 of the mobile computing device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the mobile computing device 102 may include additional processors 120 having one or more processor cores 122.

The I/O subsystem 124 of the mobile computing device 102 may be embodied as circuitry and/or components to facilitate input/output operations with the processor 120 and/or other components of the mobile computing device 102. In some embodiments, the I/O subsystem 124 may be embodied as a memory controller hub (MCH or "northbridge"), an input/output controller hub (ICH or "southbridge"), and a firmware device. In such embodiments, the firmware device of the I/O subsystem 124 may be embodied as a memory device for storing Basic Input/Output System (BIOS) data and/or instructions and/or other information (e.g., a BIOS driver used during booting of the mobile computing device 102). However, in other embodiments, I/O subsystems having other configurations may be used. For example, in some embodiments, the I/O subsystem 124 may be embodied as a platform controller hub (PCH). In such embodiments, the memory controller hub (MCH) may be incorporated in or otherwise associated with the processor 120, and the processor 120 may communicate directly with the memory 126 (as shown by the hashed line in FIG. 1). Additionally, in other embodiments, the I/O subsystem 124 may form a portion of a system-on-a-chip (SoC) and be incorporated, along with the processor 120 and other components of the mobile computing device 102, on a single integrated circuit chip.

The processor 120 is communicatively coupled to the I/O subsystem 124 via a number of signal paths. These signal paths (and other signal paths illustrated in FIG. 1) may be embodied as any type of signal paths capable of facilitating communication between the components of the mobile computing device 102. For example, the signal paths may be embodied as any number of point-to-point links, wires, cables, light guides, printed circuit board traces, vias, bus, intervening devices, and/or the like.

The memory 126 of the mobile computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 126 is communicatively coupled to the I/O subsystem 124 via a number of signal paths. Although only a single memory device 126 is illustrated in FIG. 1, the mobile computing device 102 may include additional memory devices in other embodiments. Various data and software may be stored in the memory 126. For example, one or more operating systems, applications, programs, libraries, and drivers that make up the software stack executed by the processor 120 may reside in memory 126 during execution.

The data storage 128 may be embodied as any type of device or devices configured for the short-term or long-term storage of data. For example, the data storage 128 may include any one or more memory devices and circuits, memory cards, hard disk drives, solid-state drives, or other data storage devices.

The communication circuitry 130 of the mobile computing device 102 may include any number of devices and circuitry for enabling communications between the mobile computing device 102 and the authentication server 106 and third-party login server 108 over the network 112 as discussed in more detail below. The communication circuitry 130 may be configured to use any one or more, or combination thereof, communication protocols to communicate with the network 112 such as, for example, a cellular communication protocol (e.g., Wideband Code Division Multiple Access (W-CDMA)), a wireless network communication protocol (e.g., Wi-Fi®, WiMAX), a wired network communication protocol (e.g., TCP/IP), and/or other communication protocols.

In some embodiments, the mobile computing device 102 may also include one or more peripheral devices 132. Such peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, and/or other input/output devices, interface devices, and/or peripheral devices.

In the illustrative embodiment, the mobile computing device 102 also includes a camera 134 and a display 136. The camera 134 may be embodied as a digital camera or other digital imaging device integrated with the mobile computing device 102. The camera 134 includes an electronic image sensor, such as an active-pixel sensor (APS), e.g., a complementary metal-oxide-semiconductor (CMOS) sensor, or a charge-coupled device (CCD). In the illustrative embodiment, no particular minimum image resolution is required of the camera 134; that is, the image resolution provided by standard camera phones, as well as that of more sophisticated devices, is suitable for the purposes of the present disclosure.

The display 136 of the mobile computing device 102 may be embodied as any type of display capable of displaying digital information such as a liquid crystal display (LCD), a light emitting diode (LED), a plasma display, a cathode ray tube (CRT), or other type of display device. In some embodiments, the display 136 may be coupled with a touch screen to facilitate user interaction.

In some embodiments, the mobile computing device 102 may include an audio sensor 138. The audio sensor 138 may be embodied as any sensor capable of capturing audio signals such as a microphone, a line input jack, an analog-to-digital converter (ADC), or other type of audio sensor. The audio sensor 138 is represented in FIG. 1 with hashed lines to indicate the audio sensor 138 is not present in some embodiments.

The target computing device 104 may be any type of computing device capable of performing the functions described herein. In some embodiments, the target computing device may be a less-capable device with limited modes of user interaction, such as a digital sign device, an electronic kiosk, a point-of-sale (POS) device, or the like. In alternative embodiments, the target computing device may be a more-capable computing device, such as a desktop computer, a laptop computer, a notebook computer, or a tablet computer.

The target computing device 104 may include components substantially similar to the mobile computing device 102, which have been identified in FIG. 1 with a common reference numbering scheme. As such, the description provided above of the components of the mobile computing device 102 may be equally applicable to those similar components of the target computing device 104 and are not repeated herein so as not to obscure the present disclosure. Of course, it should be appreciated that in some embodiments the mobile computing device 102 and the target computing device 104 may be dissimilar to each other, as discussed above.

Further, in some embodiments, the target computing device 104 may include an audio device 176. The audio device 176 may be embodied as any device capable of generating audio signals, such as a speaker, an audio transducer, a line out jack, a digital-to-analog converter (DAC), or other type of audio device. The audio device 176 is represented in FIG. 1 with hashed lines to indicate the audio device 176 is not present in some embodiments.

As discussed in more detail below, the mobile computing device 102 and the target computing device 104 are configured to transmit messages to the authentication server 106, the content server 110, and, optionally, the third-party login server 108 over the network 112. The network 112 may be embodied as any number of various wired and/or wireless networks. For example, the network 112 may be embodied as or otherwise include a wired or wireless local area network (LAN), a wired or wireless wide area network (WAN), and/or a publicly-accessible, global network such as the Internet. As such, the network 112 may include any number of additional devices, such as additional computers, routers, and switches, to facilitate communications between the mobile computing device 102, the target computing device 104, the authentication server 106, the content server 110, and, optionally, the third-party login server 108.

The authentication server 106 is configured to receive authentication data from the mobile computing device 102, authenticate the user, optionally using the third-party login server 108, and provide an authentication token to the target computing device 104, as discussed in more detail below.

The authentication server 106 may be embodied as any type of data server (e.g., a web server) or similar computing device capable of performing the functions described herein. As such, the authentication server 106 may include components and features similar to the mobile computing device 102 and the target computing device 104, such as a processor, I/O subsystem, memory, data storage, communication circuitry, and various peripheral devices, which are not illustrated in FIG. 1 for clarity of the present description.

The content server 110 is configured to establish a content session with the target computing device 104 and provide access to content on the device to the target computing device 104 in response to receiving an authentication token, as discussed in more detail below. Similar to the authentication server 106, the content server 110 may be embodied as any type of data server (e.g., a web server) or similar computing device capable of performing the functions described herein. As such, the content server may include components and features similar to the mobile computing device 102 and the target computing device 104, such as a processor, I/O subsystem, memory, data storage, communication circuitry, and various peripheral devices, which are not illustrated in FIG. 1 for clarity of the present description. The content server 110 may be embodied as an independent server or computing device separate from the authentication server 106 as shown in FIG. 1.

The third-party login server 108 is configured to provide third-party login services for system 100. Example third-party login servers may include web account providers such as Yahoo!®, or Google®, social networks such as Facebook® or Twitter®, e-commerce vendors such as Amazon®, or more generally any third-party server implementing an authorization protocol such as the OAuth authorization protocol.

Similar to the authentication server 106 and the content server 110, the third-party login server 108 may be embodied as any type of data server (e.g., a web server) or similar computing device capable of performing the functions described herein. As such, the third-party login server may include components and features similar to the mobile computing device 102 and the target computing device 104, such as a processor, I/O subsystem, memory, data storage, communication circuitry, and various peripheral devices, which are not illustrated in FIG. 1 for clarity of the present description. Third-party login server 108 may not be present in all embodiments, as indicated by its hashed outline in FIG. 1.

Figure 2:
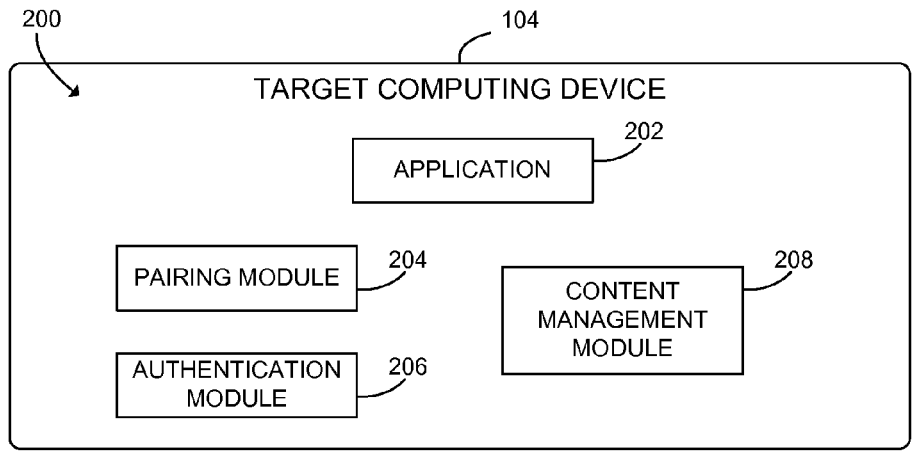
FIG. 2 is a simplified block diagram of at least one embodiment of an environment of a target computing device of the system of FIG. 1.

Referring now to FIG. 2, in one embodiment, the target computing device 104 establishes an environment 200 during operation. The illustrative embodiment 200 includes an application 202, a pairing module 204, an authentication module 206, and a content management module 208. Each of the pairing module 204, the authentication module 206, and the content management module 208 may be embodied as hardware, firmware, software, or a combination thereof. The application 202 may be embodied as any type of software or firmware application configured to allow the user to access content provided by the content server 110. For example, the application 202 may be embodied as a point of sale application, a web browser, or a digital sign display application.

The pairing module 204 is configured to generate a pairing token and present the pairing token to the mobile computing device 102. As discussed above, the pairing token may be embodied as a visual or audio cue capable of being presented using standard components of the target computing device 104.

The authentication module 206 is configured to poll the authentication server 106 and receive an authentication token when the user has successfully authenticated. Alternatively, in some embodiments the authentication module 206 may be included in the environment of content server 110, discussed in connection with FIG. 5, below. For example, the target computing device 104 may be located behind a network firewall and may be unable to contact the authentication server 106 directly.

The content management module 208 is configured to establish a communication session with the content server 110, receive a session ID identifying the communication session, and access content on the content server 110 using the authentication token received from the authentication server 106. The pairing module 204 may generate the pairing token using this session ID, as discussed in more detail below. In some embodiments, the content management module 208 may process content from the content server 110. For example, the content management module 208 may display the content or may complete a purchase transaction.

Figure 3:
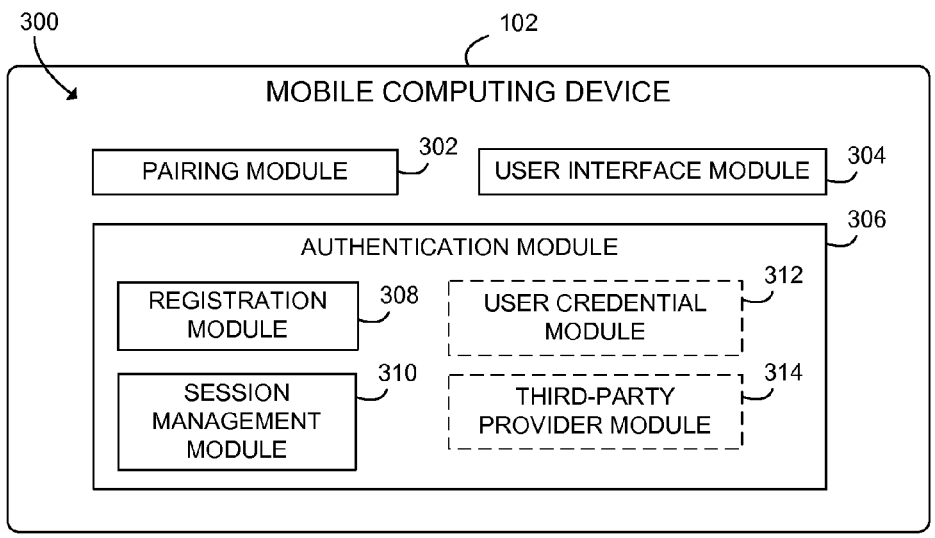
FIG. 3 is a simplified block diagram of at least one embodiment of an environment of a mobile computing device of the system of FIG. 1.

Referring now to FIG. 3, in one embodiment, the mobile computing device 102 establishes an environment 300 during operation. The illustrative embodiment 300 includes a pairing module 302, a user interface module 304, and an authentication module 306, each of which may be embodied as hardware, firmware, software, or a combination thereof. The pairing module 302 is configured to capture a pairing token presented by the target computing device 104 and determine the session ID from the pairing token.

The user interface module 304 may be configured to present an authentication user interface to the user. In some embodiments, the user interface module 304 may allow the user to define access to his or her personal information.

The authentication module 306 is configured to register the mobile computing device 102 with the authentication server 106, collect user credentials from the user, authenticate the user to the mobile computing device 102 as a function of the user credentials, and authenticate the mobile computing device 102 to the authentication server 106 using the session ID. In some embodiments, the authentication module 306 may update the user's profile, including the user's personal information. In some embodiments, the authentication module 306 may collect user credentials and authenticate the user using the third-party login server 108.

Figure 4:
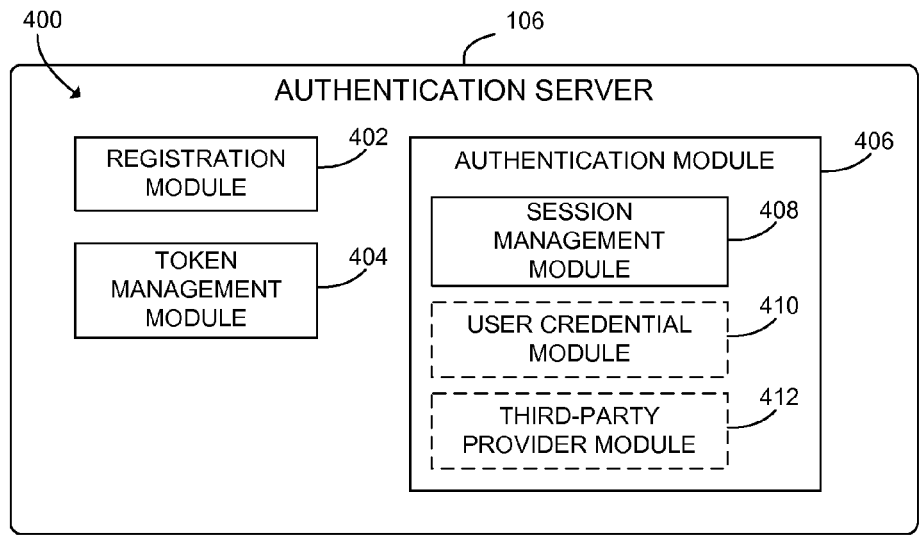
FIG. 4 is a simplified block diagram of at least one embodiment of an environment of an authentication server of the system of FIG. 1.

Referring now to FIG. 4, in one embodiment, the authentication server 106 establishes an environment 400 during operation. The illustrative embodiment 400 includes a registration module 402, a token management module 404, and an authentication module 406, each of which may be embodied as hardware, firmware, software, or a combination thereof. The registration module 402 is configured to register a mobile computing device 102 with the authentication server 106.

The token management module 404 is configured to generate an authentication token associated with the session ID. In some embodiments, the token management module 404 may generate the authentication token as a function of the session ID.

The authentication module 406 is configured to receive the session ID from the mobile computing device 102 and to authenticate the user as a function of the user credentials. In some embodiments, the authentication module 406 is configured to receive a username and a password from the mobile computing device. In alternative embodiments, the authentication module 406 is configured to authenticate the user using the third-party login server 108.

Figure 5:
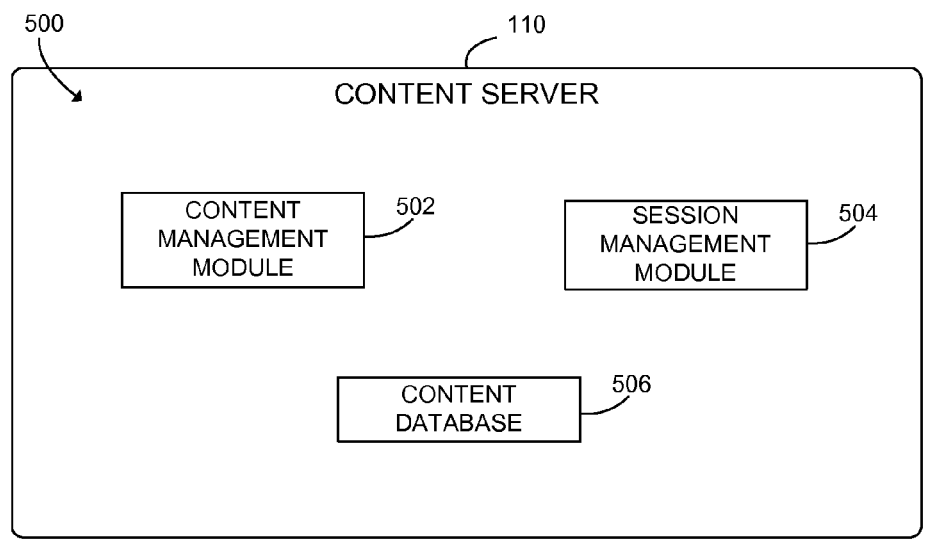
FIG. 5 is a simplified block diagram of at least one embodiment of an environment of a content server of the system of FIG. 1.

Referring now to FIG. 5, in one embodiment, the content server 110 establishes an environment 500 during operation. The illustrative embodiment 500 includes a content management module 502, a session management module 504, and a content database 506, each of which may be embodied as hardware, firmware, software, or a combination thereof. The content management module 502 is configured to provide content to the target computing device 104 in response to receiving an authentication token.

The session management module 504 is configured to generate a session ID to identify a communication session established between the content server 110 and the target computing device 104. As discussed above, the authentication token is associated with the session ID and in some embodiments may be a function of the session ID. The content database 506 is configured to store the content data that is accessed by the target computing device 104 using the content management module 502.

Figure 6:
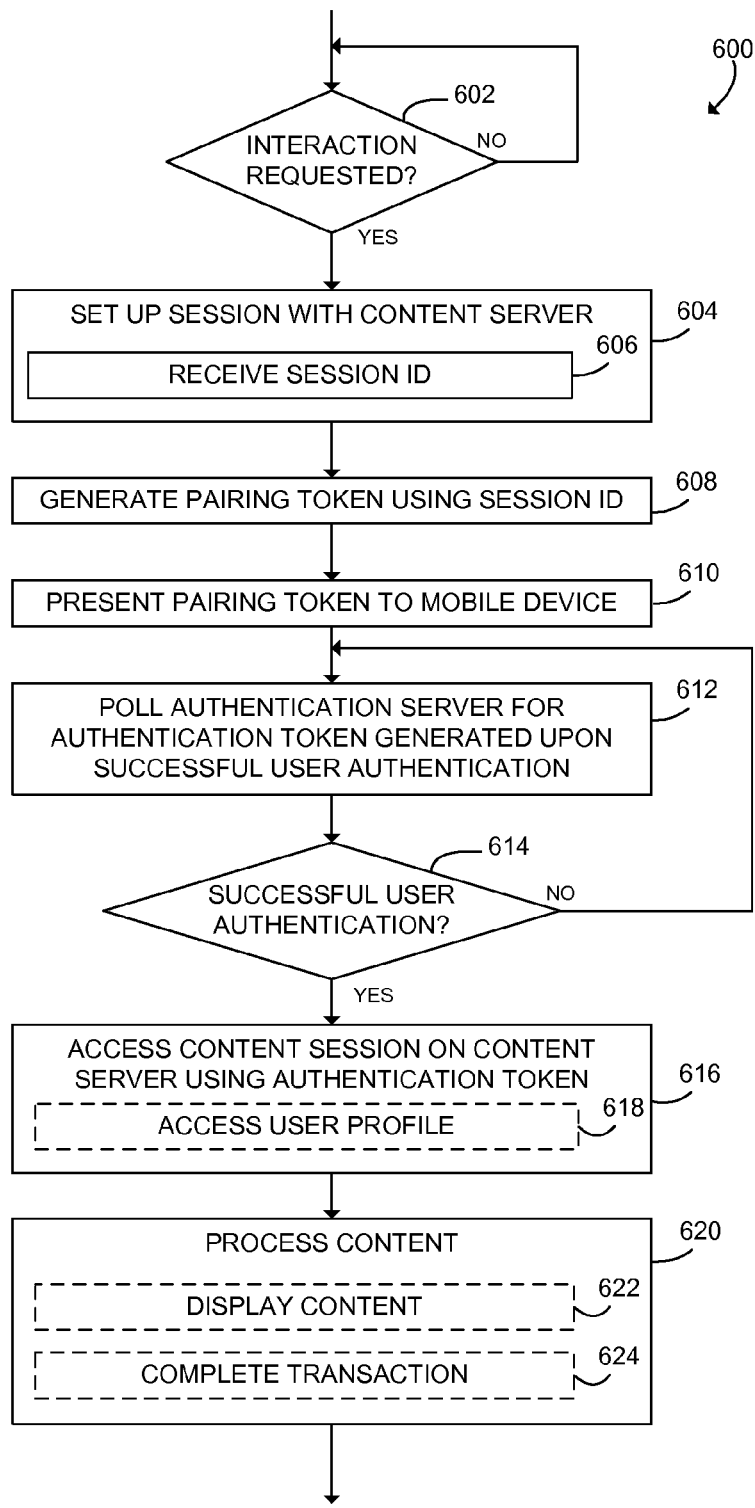
FIG. 6 is a simplified flow diagram of at least one embodiment of a method for authenticating a user of a mobile computing device to a content server, which may be executed by the target computing device of FIG. 2.

Referring now to FIG. 6, in use, the target computing device 104 may execute a method 600 for authenticating a user of the mobile computing device 102 to the content server 110. The method 600 begins with block 602, in which the target computing device 104 determines whether an interaction request from the user has been detected. The interaction request may include any suitable user interaction, such as pressing a button, selecting an on-screen user interface control, speaking a voice command, or otherwise. In some embodiments, the interaction request may not be express; for example, a digital sign device may be prepared to interact with any user within eyesight.

Upon the target computing device detecting an interaction request, the method 600 advances to block 604. In block 604, the content management module 208 sets up a communication session with the content server 110. Content provided by the content server 110 may include interactive content such as web pages, media content such as music or video, payment processing information such as credit card information, personal information about the user stored on the content server, or other digital content. In block 606, the content management module 208 receives a session ID from the content server 110. The session ID identifies the communication session between the target computing device 104 and the content server 110. The session ID may be embodied as a numeric code, a text label, a uniform resource identifier (URI), or similar identifier.

In block 608, the pairing module 204 generates a pairing token using the session ID. The pairing token may be embodied as any feature of the target computing device detectable by the mobile computing device 102 using standard input methods. For example, in some embodiments, the pairing token may be embodied as a two-dimensional bar code such as a quick response ("QR") code. In alternative embodiments, the pairing token may be an audio signal.

In block 610, the pairing module 204 presents the pairing token to the mobile computing device 102. In some embodiments, the pairing token is presented by displaying a two-dimensional bar code on the display 174 of the target computing device 104. In alternative embodiments, the pairing token is presented by playing an audio signal on the audio device 176 of the target computing device 104. After being presented the pairing token, the mobile computing device 102 proceeds to authenticate the user as discussed in more detail below.

In block 612, the authentication module 206 polls the authentication server 106 for an authentication token. The authentication token is generated by the authentication server 106 in response to the user successfully authenticating, as described in more detail below. At block 614, the authentication module 206 determines if the user has successfully authenticated. If not, method 600 loops back to block 612 to continue polling the authentication server. If the user has successfully authenticated, method 600 proceeds to block 616. Although the authentication module 206 is embodied as polling the authentication server 106, it should be apparent to those skilled in the art that other techniques for querying the authentication server 106 are possible, for example, registering with the server and waiting for an asynchronous server response.

Moving on to block 616, the content management module 208 accesses content on the content server 110 using the authentication token. In block 618, in some embodiments, the content management module 208 may access the user's profile information stored on the content server. By using the authentication token to access the content server 110, the target computing device 104 is not required to receive user credentials directly from the user or the mobile computing device 102.

In block 620, the content management module 208 processes the content from the content server 110. In block 622, processing the content may include displaying the content on a display 174 of the target computing device 104, as with audiovisual content or interactive web content. In block 624, processing the content may include completing a purchase transaction on the target computing device 104, as with payment processing content. Blocks 622 and 624 are illustrated with hashed lines to indicate they are optional.

Figure 7:
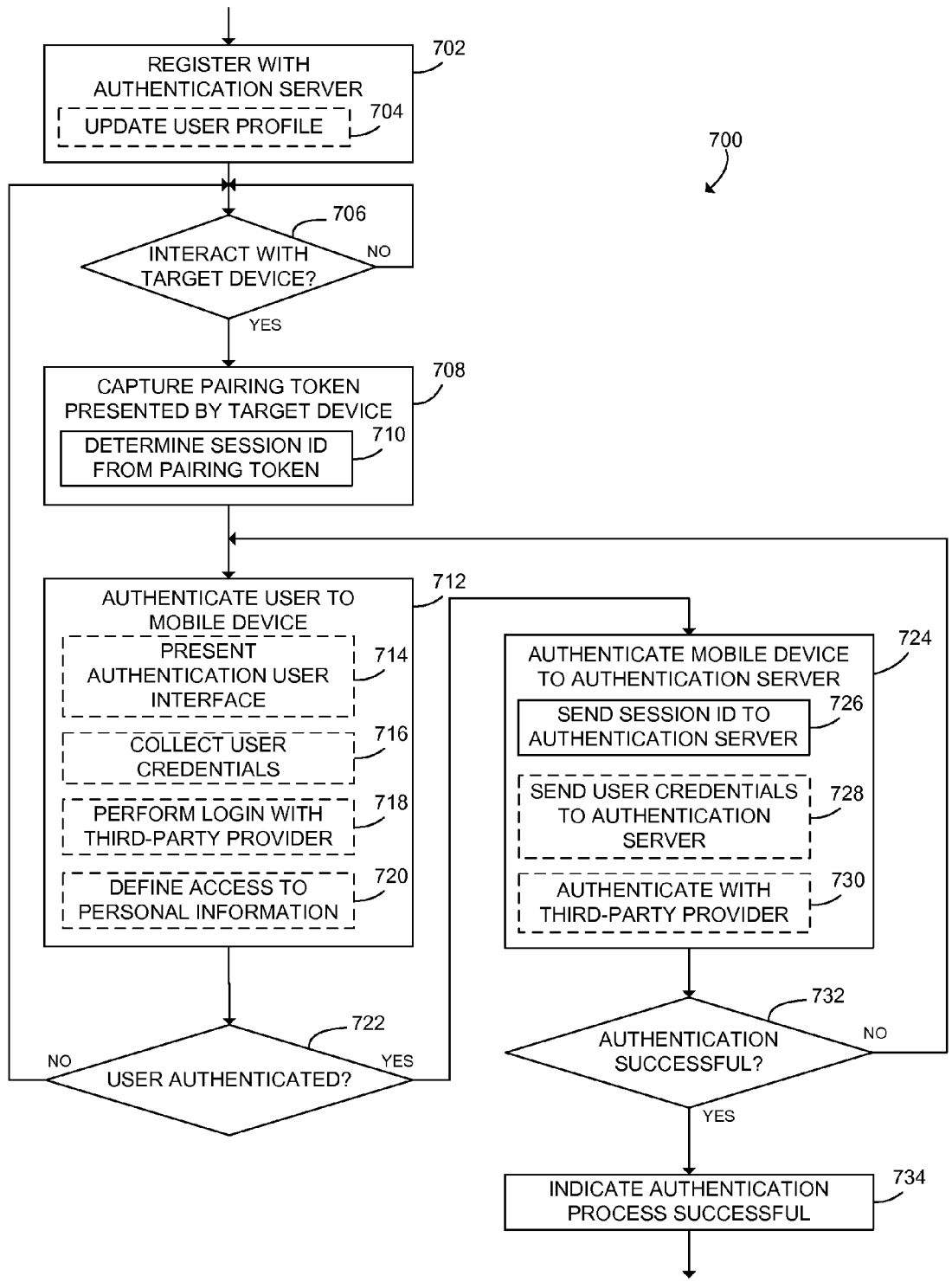
FIG. 7 is a simplified flow diagram of at least one embodiment of a method for authenticating a user of a mobile computing device to a content server, which may be executed by the mobile computing device of FIG. 3.

Referring now to FIG. 7, in use, the mobile computing device 102 may execute a method 700 to authenticate a user of the mobile computing device 102 to a content server 110. The method 700 begins with block 702, in which the registration module 308 registers with the authentication server 106. Registration may include establishing a user profile, including user credentials such as a username and a password. In block 704, in some embodiments, the registration module 308 may update the user's profile, including updating the user's personal information.

In block 706, the pairing module 302 determines whether an interaction with the target computing device 104 has occurred. If not, the method 700 loops back to block 706 and repeats. When an interaction with the target computing device 104 occurs, the method 700 advances to block 708 in which the pairing module 302 captures the pairing token presented by the target computing device 104. As described in more detail above in connection with blocks 608 and 610 of the method 600, the pairing token may be embodied as any feature of the target computing device 104 detectable by the mobile computing device 102 using standard input methods. For example, in some embodiments, the mobile computing device 102 may capture a two-dimensional bar code such as a quick response ("QR") code using the camera 134. Alternatively, in other embodiments the mobile computing device 102 may capture an audio signal using the audio sensor 138. In block 710, the pairing module 302 determines the session ID from the captured pairing token. That is, the session ID may be embedded in or otherwise represented by the pairing token. As described above, the session ID identifies a communication session between the target computing device 104 and the content server 110, and the pairing token is generated using the session ID.

In block 712, the authentication module 306 authenticates the user to the mobile computing device 102. That is, the user of the mobile computing device 102 inputs or otherwise supplies his or her user credentials to the mobile computing device 102. For example, in block 714, the user interface module 304 may present an authentication user interface to the user. This authentication user interface may be a native application, a web page, a remote access application, or other user interface. The authentication user interface may be provided by the authentication server 106 or by the third-party login server 108. In block 716, the user credential module 312 may collect user credentials of the user. The user credentials may be collected using the user interface module 304. In block 718, in some embodiments, the third-party provider module 314 may perform a login with the third-party login server 108. In block 720, the user interface module 304 may allow the user to define access to his or her personal information. For example, the user may allow or disallow access to his or her user profile. Alternatively, the user may define an allowed level of access to the user's personal information (e.g. how much and which type of personal information is accessible).

In block 722, the authentication module 306 determines whether or not the user has successfully authenticated to mobile computing device 102. If not, the method 700 loops back to block 706 and awaits another interaction with the target device. If the user has successfully authenticated to the mobile computing device 102, the method 700 advances to block 724.

In block 724, the authentication module 306 authenticates the mobile computing device 102 to the authentication server 106. To do so, in block 726, the session management module 310 sends the session ID to the authentication server. In block 728, the user credential module 312 may send the user credentials to the authentication server 106. Alternatively, in sub-block 730, the third-party provider module may authenticate the user with the third-party login server 108. The user credentials may be embodied as a username and a password, or the user credentials may be a user identity provided by the third-party login server 108.

In block 732, the authentication module 306 determines whether authentication with the authentication server 106 was successful. If authentication was not successful, the method 700 loops back to block 712, wherein the user may attempt to re-authenticate. If authentication was successful, the method 700 advances to block 734.

In block 734, the user interface module 304 may indicate to the user that the authentication process was successful. By doing so, the user is prompted to return to the target computing device 104. As discussed above in connection with FIG. 6, upon successful authentication, the target computing device 104 will receive an authentication token from the authentication server 106 and use the authentication token to access content on the content server 110.

Figure 8:
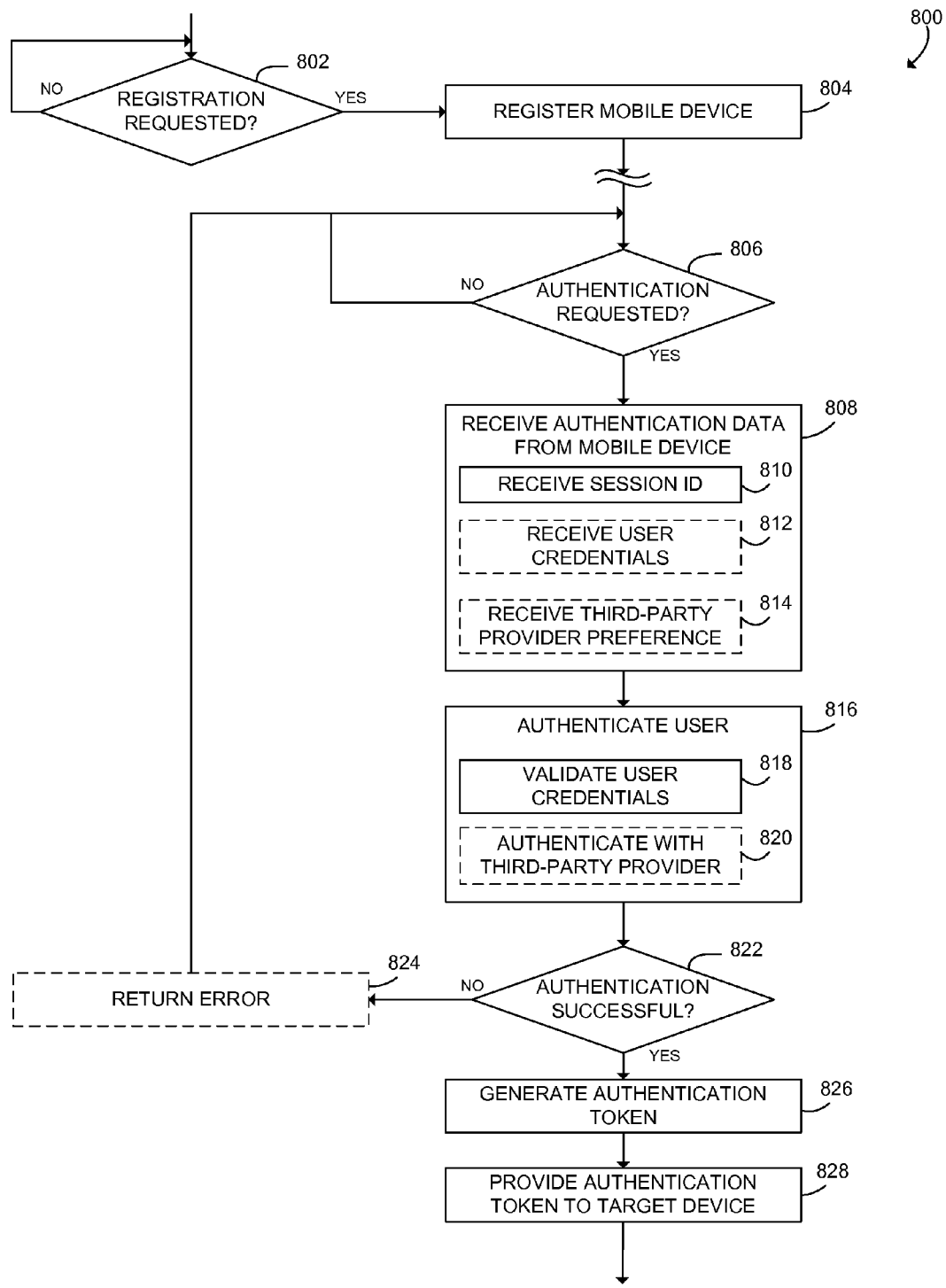
FIG. 8 is a simplified flow diagram of at least one embodiment of a method for authenticating a user of a mobile computing device to a content server, which may be executed by the authentication server of FIG. 4.

Referring now to FIG. 8, in use, the authentication server 106 may execute a method 800 to authenticate a user of the mobile computing device 102 to a content server 110. The method 800 begins with block 802, in which the authentication server 106 waits for a registration request from the mobile computing device 102. Upon receiving a registration request, the method 800 advances to block 804, where the registration module 402 registers the mobile computing device 102 with authentication server 106.

Following block 804, some time may elapse as indicated by the broken line between blocks 804 and 806. In block 806, the authentication server 106 waits for an authentication request received from mobile computing device 102. Upon receiving an authentication request, the method 800 advances to block 808.

In block 808, the authentication module 406 receives authentication data from the mobile computing device 102. In block 810, the session management module 408 receives the session ID. As described above, the session ID identifies a content session established between the target computing device 104 and the content server 110. In block 812, the user credential module 410 may receive the user credentials. The user credentials may be a username and a password, or the user credentials may be a user identity provided by the third-party login server 108. In block 814, the third-party provider module 412 may receive a third-party provider preference from the mobile computing device 102. The third-party provider preference may identify the appropriate third-party login server 108.

In block 816, the authentication module 406 authenticates the user as a function of the user credentials. In block 818, the authentication module 406 validates the user credentials. User credentials may be validated by confirming that the username and password received from the mobile computing device 102 are correct, such as by validating the username and password against a flat file or against a directory service such as LDAP, ActiveDirectory, or the like. Alternatively, in block 820, the third-party provider module 412 may authenticate the user with the third-party login server 108.

In block 822, the authentication module 406 determines whether the user successfully authenticated. If not successfully authenticated, the method 800 may advance to optional block 824, where the authentication server 106 returns an error condition to the mobile computing device 102, and then the method 800 loops back to block 806 to await another authentication request. If authentication was successful, the method 800 advances to block 826.

In block 826, the token management module 404 generates an authentication token. The authentication token is associated with the session ID. In some embodiments, the authentication token may be a function of the session ID. For example, the authentication token may be generated by cryptographically signing data including the session ID, a random number to prevent replay attacks, and additional context information. Any suitable cryptographic signature scheme may be used, for example RSA, DSA, or ElGamal.

In block 828, the token management module 404 provides the authentication token to the target computing device 104. As described in more detail above, the target computing device may poll the authentication server 106 repeatedly until the authentication token becomes available following successful authentication of the user. Also as described in more detail above, the target computing device 104 may use the authentication token to access content on the content server 110.

Figure 9:
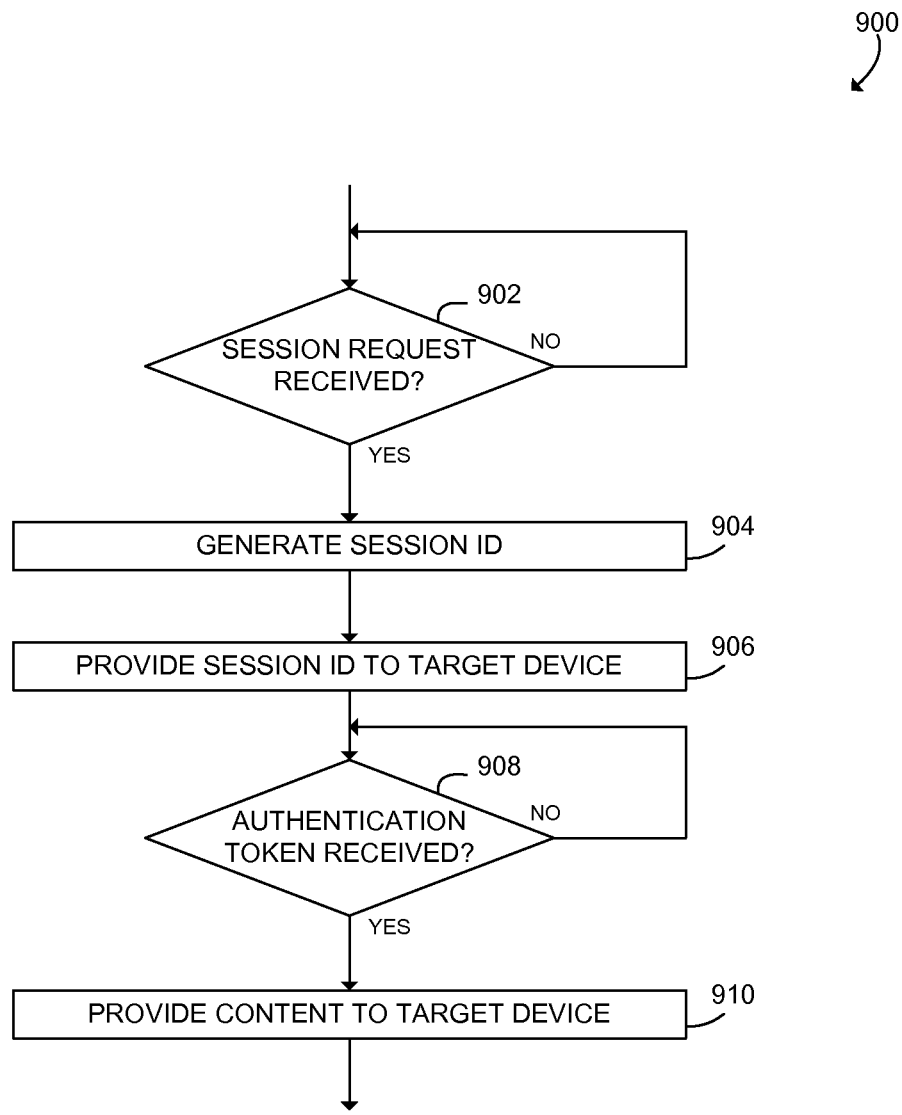
FIG. 9 is a simplified flow diagram of at least one embodiment of a method for authenticating a user of a mobile computing device to a content server, which may be executed by the content server of FIG. 5.

Referring now to FIG. 9, in use, the content server 110 may execute a method 900 to authenticate a user of the mobile computing device 102 to the content server 110. The method 900 begins with block 902, where the content server 110 waits for a session request from the target computing device 104. Upon receiving a session request, the method 900 advances to block 904.

In block 904, the session management module 504 generates a session ID to identify the content session between the target computing device 104 and the content server 110. In block 906, the session management module 504 provides the session ID to the target computing device 104. As discussed in more detail above, the session ID is used to generate the pairing token passed from the target computing device 104 to the mobile computing device 102, and is in turn used by the mobile computing device 102 to authenticate the user to the authentication server 106.

In block 908, the content management module 502 determines whether an authentication token has been received from the target computing device 104. If not, the method 900 continues to wait at block 908. If an authentication token is received, the method 900 advances to block 910.

In block 910, the content management module 502 provides content to the target computing device 104. As discussed above, the target computing device 104 uses the authentication token to access the content. The content may be supplied by the content database 506. As discussed above, content may include interactive content, media content, payment processing content, personal information about the user, or other digital content.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

Example 1 includes a computing device to authenticate a user to a content server. The computing device includes a pairing module to (i) generate a pairing token using a session ID received from the content server and (ii) present the pairing token to a mobile computing device controlled by the user to allow the user to authenticate to an authentication server; an authentication module to receive an authentication token from the authentication server in response to successful authentication of the user by the mobile computing device; and a content management module to access content on the content server using the authentication token.

Example 2 includes the subject matter of Example 1, and wherein to access content on the content server comprises to access user profile information of the user.

Example 3 includes the subject matter of any of Examples 1 and 2, and wherein the content management module is to process the content accessed from the content server.

Example 4 includes the subject matter of any of Examples 1-3, and wherein to process the content comprises to display the content accessed from the content server.

Example 5 includes the subject matter of any of Examples 1-4, and wherein to process the content comprises to complete a purchase transaction on the computing device.

Example 6 includes the subject matter of any of Examples 1-5, and further including a display, wherein the pairing token comprises a two-dimensional bar code and the pairing module is to present the pairing token by displaying the pairing token on the display of the computing device.

Example 7 includes the subject matter of any of Examples 1-6, and wherein the pairing token comprises a quick response ("QR") code.

Example 8 includes the subject matter of any of Examples 1-7, and further including an audio device, wherein the pairing token comprises an audio signal and the pairing module is to present the pairing token by playing the pairing token using the audio device of the computing device.

Example 9 includes a mobile computing device to authenticate a user to a content server. The mobile computing device includes a pairing module to (i) capture a pairing token presented by a target computing device; and (ii) determine a session ID from the pairing token, wherein the session ID identifies a communication session between the target computing device and the content server; and an authentication module to (i) to collect user credentials provided by the user; (ii) authenticate the user to the mobile computing device as a function of the user credentials; and (iii) authenticate the mobile computing device to an authentication server using the session ID.

Example 10 includes the subject matter of Example 9, and wherein the authentication module is to authenticate the mobile computing device to the authentication server in response to successfully authenticating the user to the mobile computing device.

Example 11 includes the subject matter of any of Examples 9 and 10, and further including a camera, wherein the pairing token comprises a two-dimensional bar code and the pairing module is to capture the pairing token using the camera.

Example 12 includes the subject matter of any of Examples 9-11, and further including a camera, wherein the pairing token comprises a quick response ("QR") code and the pairing module is to capture the pairing token using the camera.

Example 13 includes the subject matter of any of Examples 9-12, further including an audio sensor, wherein the pairing token comprises an audio signal, and the pairing module is to capture the pairing token using the audio sensor.

Example 14 includes the subject matter of any of Examples 9-13, and wherein the user credentials comprise a username and a password.

Example 15 includes the subject matter of any of Examples 9-14, and further including a user interface module to (i) present a login user interface and (ii) receive user credentials provided by the user using the login user interface.

Example 16 includes the subject matter of any of Examples 9-15, and further including a user interface module to (i) receive a login user interface from a third-party login server, (ii) present the login user interface to the user, and (iii) receive user credentials provided by the user using the login user interface.

Example 17 includes the subject matter of any of Examples 9-16, and further including a user interface module to present a user interface to the user, wherein the user interface is to allow the user to define a level of access to personal information of the user stored on the content server.

Example 18 includes an authentication server to authenticate a user of a mobile computing device to a content server. The authentication server includes an authentication module to (i) receive a session ID from the mobile computing device, wherein the session ID identifies a communication session between the content server and a target computing device, (ii) receive user credentials of the user of the mobile computing device, and (iii) authenticate the user as a function of the user credentials; and a token management module to generate an authentication token associated with the session ID in response to the user being successfully authenticated.

Example 19 includes the subject matter of Example 18, and wherein the user credentials comprise a username and a password.

Example 20 includes the subject matter of any of Examples 18 and 19, and wherein the authentication module is to receive user credentials of the user from the mobile computing device.

Example 21 includes the subject matter of any of Examples 18-20, and wherein the authentication module is to validate the user credentials.

Example 22 includes the subject matter of any of Examples 18-21, and wherein the authentication module is to authenticate the user credentials using a third-party login server.

Example 23 includes the subject matter of any of Examples 18-22, and wherein the token management module is to generate an authentication token as a function of the session ID.

Example 24 includes a method to authenticate a user of a mobile computing device to a content server. The method includes generating, on a target computing device, a pairing token using a session ID received from the content server, wherein the session ID identifies a communication session between the target computing device and the content server; presenting, from the target computing device, the pairing token to the mobile computing device; receiving, on the target computing device, an authentication token from an authentication server in response to successful authentication of the user by the mobile computing device; and accessing, with the target computing device, content on the content server using the authentication token.

Example 25 includes the subject matter of Example 24, and wherein accessing content on the content server comprises accessing user profile information stored on the content server.

Example 26 includes the subject matter of any of Examples 24 and 25, and further including processing, on the target computing device, the content accessed on the content server.

Example 27 includes the subject matter of any of Examples 24-26, and wherein processing the content comprises displaying on the target computing device the content accessed on the content server.

Example 28 includes the subject matter of any of Examples 24-27, and wherein processing the content comprises completing a purchase transaction on the target computing device.

Example 29 includes the subject matter of any of Examples 24-28, and wherein presenting the pairing token comprises displaying a two-dimensional bar code on a display of the target computing device.

Example 30 includes the subject matter of any of Examples 24-29, and wherein presenting the pairing token comprises displaying a quick response ("QR") code on a display of the target computing device.

Example 31 includes the subject matter of any of Examples 24-30, and wherein presenting the pairing token comprises playing an audio signal using an audio device of the target computing device.

Example 32 includes a device comprising a processor; and a memory having stored therein a plurality of instructions that when executed by the processor cause the device to perform the method of any of Examples 24-31.

Example 33 includes one or more machine readable storage media comprising a plurality of instructions stored thereon that in response to being executed result in a device performing the method of any of Examples 24-31.

Example 34 includes a method to authenticate a user of a mobile computing device to a content server. The method includes capturing, on the mobile computing device, a pairing token presented by a target computing device; determining, on the mobile computing device, a session ID from the pairing token, wherein the session ID identifies a communication session between the target computing device and the content server; authenticating the user to the mobile computing device by collecting user credentials on the mobile computing device; and authenticating the mobile computing device to an authentication server using the session ID.

Example 35 includes the subject matter of Example 34, and wherein capturing the pairing token comprises capturing a two-dimensional bar code using a camera of the mobile computing device.

Example 36 includes the subject matter of any of Examples 34 and 35, and wherein capturing the pairing token comprises capturing a quick response ("QR") code using a camera of the mobile computing device.

Example 37 includes the subject matter of any of Examples 34-36, and wherein capturing the pairing token comprises capturing an audio signal using an audio sensor of the mobile computing device.

Example 38 includes the subject matter of any of Examples 34-37, and wherein collecting user credentials comprises collecting a username and a password.

Example 39 includes the subject matter of any of Examples 34-38, and wherein collecting user credentials comprises presenting, on the mobile computing device, a login user interface; and receiving, with the mobile computing device, the user credentials using the login user interface.

Example 40 includes the subject matter of any of Examples 34-39, and wherein collecting user credentials comprises receiving, on the mobile computing device, a login user interface provided by a third-party login server; presenting, on the mobile computing device, the login user interface; and receiving, with the mobile computing device, the user credentials using the login user interface.

Example 41 includes the subject matter of any of Examples 34-40, and further including presenting, on the mobile computing device, a user interface; and allowing, with the user interface, the user to define a level of access to personal information of the user stored on the content server.

Example 42 includes a device comprising a processor; and a memory having stored therein a plurality of instructions that when executed by the processor cause the device to perform the method of any of Examples 34-41.

Example 43 includes one or more machine readable storage media comprising a plurality of instructions stored thereon that in response to being executed result in a device performing the method of any of Examples 34-41.

Example 44 includes a method for an authentication server to authenticate a user of a mobile computing device to a content server, the method comprising receiving, on the authentication server, a session ID from the mobile computing device, wherein the session ID identifies a communication session between the target computing device and the content server; receiving, on the authentication server, user credentials of the user of the mobile computing device; authenticating, on the authentication server, the user as a function of the user credentials; and generating, on the authentication server, an authentication token associated with the session ID in response to successfully authenticating the user.

Example 45 includes the subject matter of Example 44, and wherein receiving the user credentials comprises receiving a username and a password.

Example 46 includes the subject matter of any of Examples 44 and 45, and wherein receiving the user credentials comprises receiving the user credentials from the mobile computing device.

Example 47 includes the subject matter of any of Examples 44-46, and further including validating the user credentials on the authentication server.

Example 48 includes the subject matter of any of Examples 44-47, and wherein authenticating the user comprises authenticating the user using a third-party login server.

Example 49 includes the subject matter of any of Examples 44-48, and wherein generating the authentication token comprises generating the authentication token as a function of the session ID.

Example 50 includes a device comprising a processor; and a memory having stored therein a plurality of instructions that when executed by the processor cause the device to perform the method of any of Examples 44-49.

Example 51 includes one or more machine readable storage media comprising a plurality of instructions stored thereon that in response to being executed result in a device performing the method of any of Examples 44-49.

The invention claimed is:

1. A target computing device to authenticate a user to a content server, the target computing device comprising:
   a pairing module to (i) generate a pairing token as a function of a session ID received from the content server, wherein the pairing token is indicative of the session ID and comprises a feature of the target computing device detectable by a sensor of a mobile computing device controlled by the user and (ii) present the pairing token to the mobile computing device controlled by the user to allow the user to authenticate to an authentication server;
   an authentication module to receive an authentication token from the authentication server in response to presentation of the pairing token to the mobile computing device, wherein the authentication token indicates successful authentication of the user by the mobile computing device; and
   a content management module to (i) transmit the authentication token to the content server and (ii) access content on the content server in response to transmission of the authentication token.

2. The target computing device of claim 1, wherein to access content on the content server comprises to access user profile information of the user.

3. The target computing device of claim 1, wherein the content management module is to process the content accessed from the content server.

4. The target computing device of claim 3, wherein to process the content comprises to display the content accessed from the content server or to complete a purchase transaction on the target computing device.

5. The target computing device of claim 1, further comprising a display, wherein the pairing token comprises a token selected from the group consisting of a two-dimensional bar code and a quick response ("QR") code, and the pairing module is to present the pairing token by displaying the pairing token on the display of the target computing device.

6. The target computing device of claim 1, further comprising an audio device, wherein the pairing token comprises an audio signal and the pairing module is to present the pairing token by playing the pairing token using the audio device of the target computing device.

7. One or more non-transitory, machine-readable media comprising a plurality of instructions that in response to being executed result in a target computing device:
   generating, on the target computing device, a pairing token as a function of a session ID received from a content server, wherein the session ID identifies a communication session between the target computing device and the content server, and wherein the pairing token is indicative of the session ID and comprises a feature of the target computing device detectable by a sensor of a mobile computing device controlled by a user;
   presenting, from the target computing device, the pairing token to the mobile computing device;
   receiving, on the target computing device, an authentication token from an authentication server in response to presenting the pairing token to the mobile computing device, wherein the authentication token indicates successful authentication of the user of the mobile computing device by the mobile computing device;
   transmitting, by the target computing device, the authentication token to the content server; and
   accessing, with the target computing device, content on the content server in response to transmitting the authentication token.

8. The machine-readable media of claim 7, wherein accessing content on the content server comprises accessing user profile information stored on the content server.

9. The machine-readable media of claim 7, further comprising a plurality of instructions that in response to being executed result in the computing device processing, on the target computing device, the content accessed on the content server.

10. The machine-readable media of claim 9, wherein processing the content comprises displaying on the target computing device the content accessed on the content server or completing a purchase transaction on the target computing device.

11. The machine-readable media of claim 7, wherein presenting the pairing token comprises at least one of: displaying a two-dimensional bar code on a display of the target computing device and playing an audio signal using an audio device of the target computing device.

12. A method for authenticating a user to a content server, the method comprising:
   generating, on a target computing device, a pairing token as a function of a session ID received from a content server, wherein the session ID identifies a communication session between the target computing device and the content server, and wherein the pairing token is indicative of the session ID and comprises a feature of the target computing device detectable by a sensor of a mobile computing device controlled by the user;
   presenting, from the target computing device, the pairing token to the mobile computing device;
   receiving, on the target computing device, an authentication token from an authentication server in response to presenting the pairing token to the mobile computing device, wherein the authentication token indicates successful authentication of a user of the mobile computing device by the mobile computing device;
   transmitting, by the target computing device, the authentication token to the content server; and
   accessing, with the target computing device, content on the content server in response to transmitting the authentication token.

13. The method of claim 12, wherein accessing content on the content server comprises accessing user profile information stored on the content server.

14. The method of claim 12, further comprising processing, on the target computing device, the content accessed on the content server.

15. The method of claim 14, wherein processing the content comprises displaying on the target computing device the content accessed on the content server or completing a purchase transaction on the target computing device.

16. The method of claim 15, wherein presenting the pairing token comprises at least one of: displaying a two-dimensional bar code on a display of the target computing device and playing an audio signal using an audio device of the target computing device.

* * * * *